(No Model.)
W. H. MUNFORD.
GLASS CUTTING APPARATUS.
No. 325,855. Patented Sept. 8, 1885.
2 Sheets—Sheet 1.
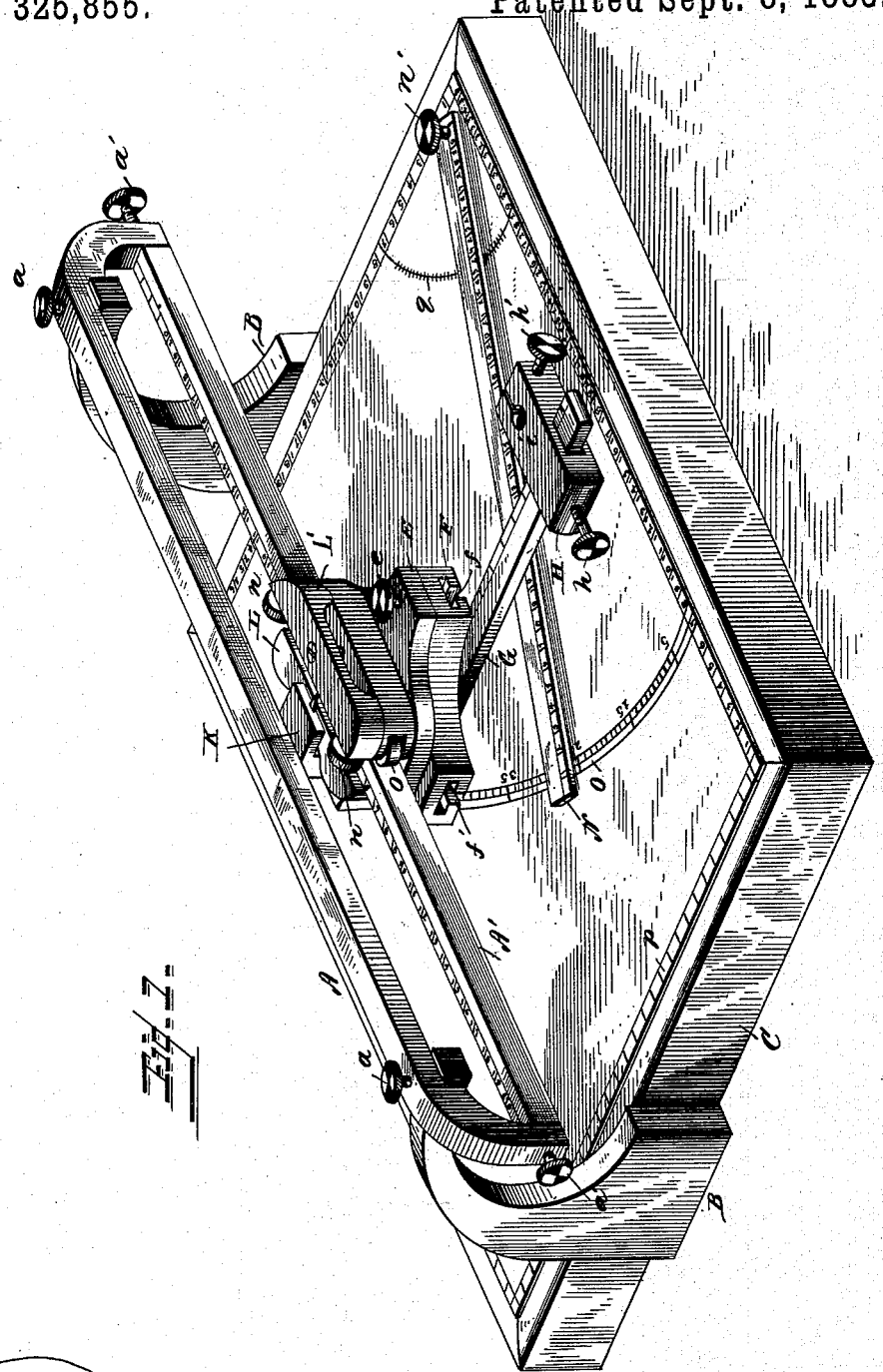
WITNESSES
INVENTOR
William H. Munford
By J. H. MacDonald
Attorney

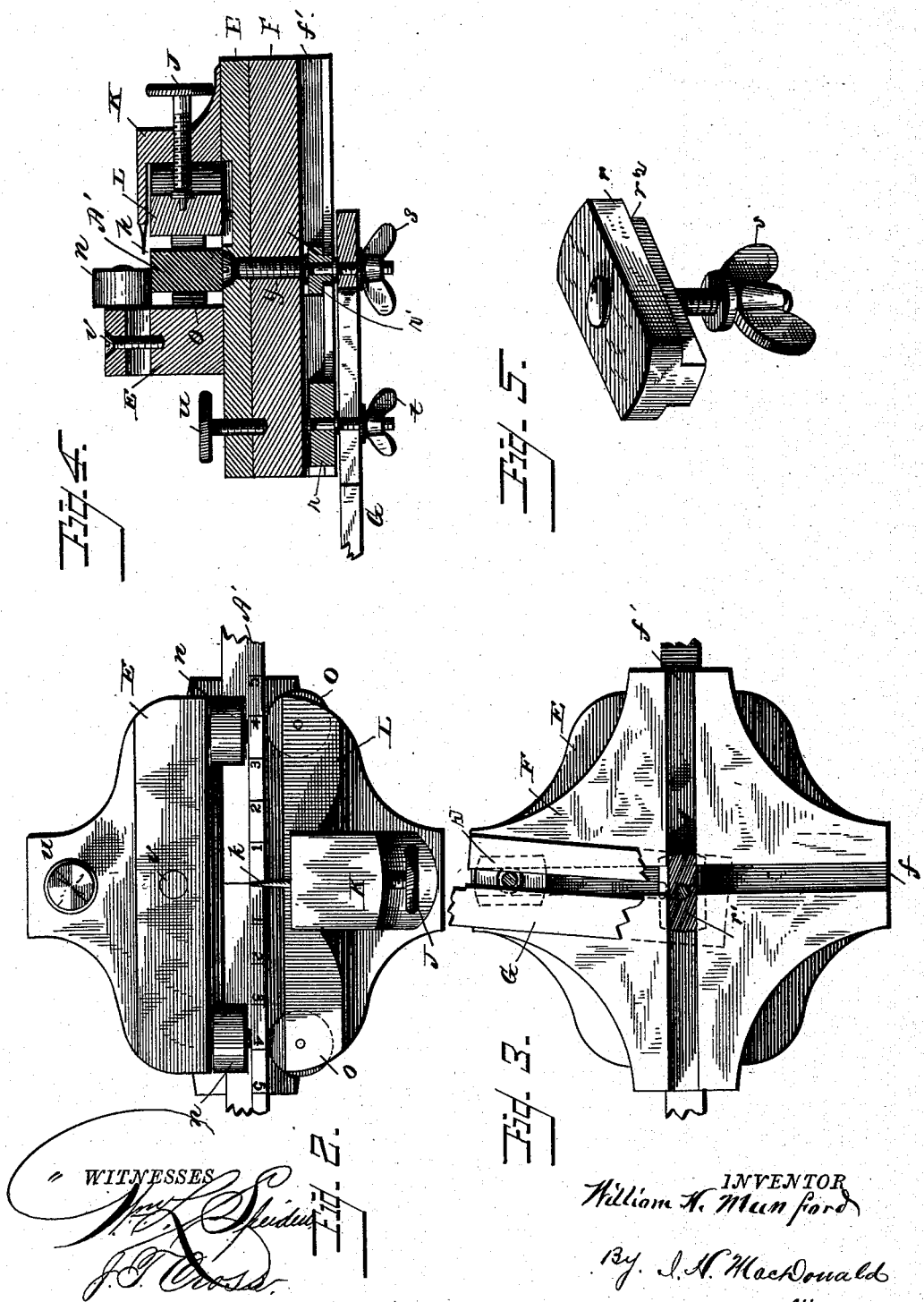

UNITED STATES PATENT OFFICE.

WILLIAM H. MUNFORD, OF ANNA, OHIO.

GLASS-CUTTING APPARATUS.

SPECIFICATION forming part of Letters Patent No. 325,855, dated September 8, 1885.

Application filed November 26, 1884. (No model.)

*To all whom it may concern:*

Be it known that I, WILLIAM H. MUNFORD, a citizen of the United States, residing at Anna, in the county of Shelby and State of Ohio, have invented certain new and useful Improvements in Glass-Cutting Apparatus; and I do hereby declare the following to be a full, clear, and exact description of the invention, such as will enable others skilled in the art to which it appertains to make and use the same.

My invention relates to a device for cutting glass to any size or shape; and to this end it consists in certain details of construction and arrangement of the several parts, as will be hereinafter more fully set forth in the specification, and pointed out in the accompanying drawings, in which—

Figure 1 is a perspective view of the device; Fig. 2, a top view of the sliding head; Fig. 3, a bottom plan view of same; Fig. 4, a section of same, and Fig. 5 a detailed perspective view of the adjusting block and clamp therefor.

Referring more particularly to the drawings, it will be seen that the gage and cutter are mounted on a supporting table or base, C. This table is graduated along its edges with a series of graduations, $p$, of any particular scale, preferably inches, although it may be graduated to a decimal or metric system. I have also placed upon said table two sets of arc scales, $o\ q$.

Attached to the sides of the table C are two supports, B, upon which is seated a two-armed frame, A A', the lower arm, A', of which is graduated on one or two faces, as shown in Fig. 1. This frame is secured together and to the supports B by means of the set-screws $a\ a'$, Fig. 1.

Upon the table and moving upon the graduated bar A', I have placed a traveling head, E. On the top of this head, and journaled in a moving frame, L, are two sets of friction-rollers, $n$, moving along the upper graduated face of the bar K, and two sets of side friction-rollers, $o$, journaled in the bearing-frame L', which move along the front and rear faces of said bar. This allows a free movement of the head along the bar without slipping or sticking.

When it is desired to stop the head at any particular graduation on the bar A', a set-screw, J, passing through the index-bar K, presses the roller-bearing frame L against the arm A', thus preventing any further movement. An index-pointer, $k$, on top of bar L, shows the exact point to be arrived at. On the under side of head E, and pivoted centrally thereto by means of the pin or screw $y$, Fig. 2, is a movable block, F, which has on its under side two central guide-slots, $f\ f'$, Fig. 3, at right angles to each other. A bar, G, having guide-heads $r$, is adapted to move back and forth beneath the block F, the guide heads or projections $r$ moving in the slots $f f'$.

At the outer end of the bar G a slotted cutter-head, H, is attached by means of the set-screw $h$. It is apparent that the cutter-head can be moved to any desired position on this bar by slipping it along the bar and then tightening the set-screw $h$.

At the outer end of the cutter-head is a slot, $i$, in which may be placed a diamond cutting-point, (similar to a glazier's glass-cutter,) and held by the set-screw $h'$.

A graduated-scale bar, N, pivoted at an angle of the table, as at $n'$, affords a measurement for the arcs $o\ q$.

The table, which may be of any convenient size, receives the glass to be cut. The bar G, when held in position by the set-screws $t\ s$, can be moved straight across the table by the traveling head moving along the arm A'; or the head can be moved to any desired point on the scale of arm A', then the set-screws $t\ s$ may be loosened and the arm G caused to move in the arc of a circle or ellipse, for the head F, turning about the pin $y$ as a center, will give us an arc of a circle; or, again, if the guide-heads are moved, one into the slot $f$ and the other into the slot $f'$, and the bar G moved in either direction to the right or left, this movement gives the arc of an ellipse. At the same time the head E may travel on its arm A', and the arc or curve be increased or decreased according to the distance it is moved from the first or starting point.

The device as constructed presents a "vade mecum" for glaziers or persons desiring to cut glass in curved or rectilinear lines. As the movements of the cutter are positive and continous, there is no danger of breakage caused by an uneven pressure of the cutter. Moreover, there is no danger of the parts getting out of order, and the device is easily and quickly manipulated.

Having thus described my invention, what I claim as new, and desire to secure by Letters Patent, is—

1. In a glass-cutting apparatus, the combination, with the base and graduated removable arm A', of a traveling head-block, E, provided with the friction-rollers and an index-pointer, substantially as and for the purpose set forth.

2. In a glass-cutting device, a traveling head consisting of the pieces E F, centrally pivoted, the upper one being provided with friction-rollers and an index-pointer, the lower one having tongue-grooves at right angles to each other, substantially as and for the purpose set forth.

3. In a glass-cutting device, the combination, with the traveling head consisting of two pieces centrally pivoted and adapted to move together or separately about the pivot, of the movable bar G, having guide-heads moving in the slots in the lower piece of the traveling head, substantially as and for the purpose set forth.

4. In a glass-cutting device, the combination, with the traveling head consisting of two pivoted plates, one of which is slotted on its under side, of the movable bar G and the cutter-head H, adjustably secured to said bar and provided with means for securing a glass-cutter, substantially as and for the purpose set forth.

In testimony whereof I affix my signature in presence of two witnesses.

WILLIAM H. MUNFORD.

Witnesses:
R. D. MEDE,
FRANK VOGT.